Aug. 31, 1965 R. CHUPICK 3,203,730
HEADLINING LISTING WIRE SUPPORT
Filed Sept. 24, 1962

INVENTOR.
Ronald Chupick
BY
W. S. Pettigrew
ATTORNEY

United States Patent Office 3,203,730
Patented Aug. 31, 1965

3,203,730
HEADLINING LISTING WIRE SUPPORT
Ronald Chupick, Livonia, Mich., assignor to General Motors Corporation, Detroit, Mich., a corporation of Delaware
Filed Sept. 24, 1962, Ser. No. 225,486
7 Claims. (Cl. 296—137)

This invention relates to vehicle bodies and more particularly to a headlining listing wire support for vehicle bodies.

It is well-known to provide vehicle bodies with listing wires or rods which extend transversely of the passenger compartment and support the body headlining fabric or material. Normally the listing wires are supported only at their ends in the side roof rail structure of the body, but in certain instances, due to the long span of the wire or otherwise it is necessary to support the wire intermediate the attached ends thereof.

This invention provides a support which cooperates with the listing wire in supporting the headlining so that the headlining does not sag and an exceedingly rigid listing wire is not required.

One feature of this invention is that it provides a headlining listing wire support which is fulcrumed on the body and includes an end portion adapted to support the listing wire.

Another feature of this invention is that it provides a headlining listing wire support fulcrumed intermediate the ends thereof on the body, with one end portion thereof being biased in a downward direction to bias the other end portion thereof, which supports the listing wire, in an upward direction.

A further feature of this invention is that it provides a headlining listing wire support which includes a resilient lever member fulcrumed intermediate its ends on the body, with one end portion thereof bearing against the body roof structure so as to be biased in a downward direction and causing the other end portion of the lever to be biased in an upward direction about the fulcrum and thereby support a listing wire against downward displacement.

These and other features of the invnetion will be more readily apparent from the following specification and drawings wherein.

Figure 1:
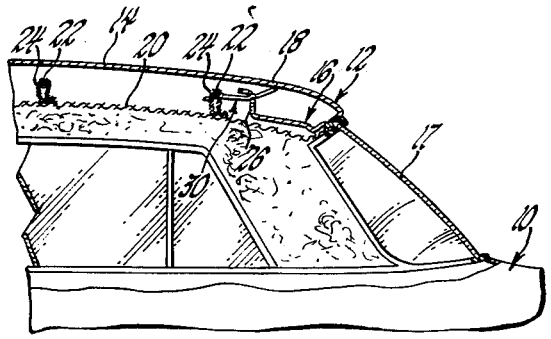
FIGURE 1 is a partially broken away partial side elevational view of a vehicle body embodying a headlining listing wire supported according to this invention.

Referring now particularly to FIGURE 1 of the drawings, a vehicle body designated generally as 10 includes a roof structure 12 which includes a roof panel 14 and a transverse roof rail or reinforcement member 16 having its rearward flanged edge secured to the flanged edge of roof panel 14 to define the opening for the rear window 17 of the body. Member 16 includes a generally vertically disposed portion 18 provided with an elongated slot or aperture 19 which is located approximately at the longitudinal center line of body 10. Panel 14 is concealed by headlining 20 having the front, rear and side edge portions thereof attached in a conventional manner to the body to form an attractive false ceiling for the passenger compartment. Semi-rigid headlining listing rods or wires 22 extend transversely of the body intermediate the roof panel 14 and the headlining 20 at spaced intervals along the length of the roof structure and provide a support for the headlining to prevent sagging of the headlining intermediate the edge portions thereof. The ends of wires 22 are secured in a conventional manner to the side roof rail structures of the body, and the wires are self-supporting between their secured ends. Loops 24 stitched to the headlining fabric support the fabric on the listing wires.

Figure 2:
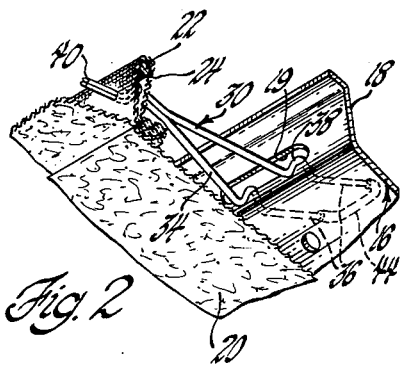
FIGURE 2 is an enlarged perspective view of a portion of FIGURE 1.
Figure 3:
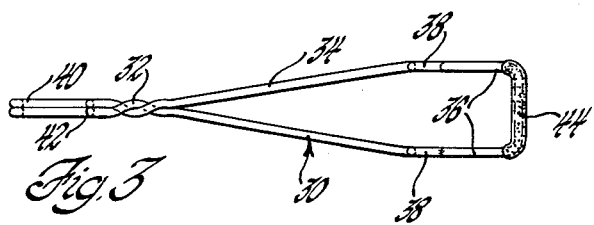
FIGURE 3 is an enlarged plan view of the support.
Figure 4:
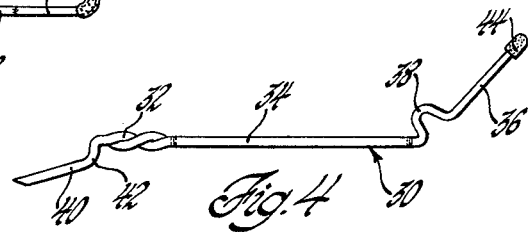
FIGURE 4 is an elevational view of the support.

Referring now to FIGURES 2, 3, and 4, the listing wire support of this invention generally comprises a lever-like member 30 fulcrumed intermediate the ends thereof on the lower edge of the slot 19. Member 30 is formed from a single piece of spring wire or rod which is bent to the desired shape and has the end portions thereof twisted at 32 to form a closed loop structure having a generally V shaped portion 34 and a generally U shaped portion 36, the legs of which are interconnected by holding and fulcrum bends 38. The end portion 40 of member 30 is joined to the twisted portion 32 by an offset portion which cooperates therewith in providing a listing rod nesting bend 42. End portion 40 is sharpened at its free end and the base 44 of U shaped portion 36 is rubber sleeved.

Support 30 is mounted on the body by moving portion 36 through the slot 19 until bends 38 rest on the lower edge of slot 19 to fulcrum member 30 on member 16. After support 30 is initially fulcrumed on member 16, the V shaped portion 34 is manually grasped and pulled downwardly to move base 44 of portion 36 upwardly into engagement with roof panel 14. Portion 34 is then moved further downwardly about the bends 38 until it is located in the position shown in FIGURE 1, and the sharpened end of portion 40 is then caused to pierce loop 24 immediately under listing wire 22 to nest the listing wire in bend 42. As shown in FIGURE 4, the portions 34 and 36 are normally located at a predetermined angle of approximately 130 degrees, and this angular relationship is increased when portion 34 is located in the position as shown in FIGURE 1. The internal stress developed in member 30 by deforming it into the position shown in FIGURE 1 acts to return portion 34 to its normal angular relationship with portion 36 and thus causes end portion 40 to resiliently support the listing wire 22 and the headlining 20 against downward displacement relative to the roof panel 14.

The second embodiment of this invention is intended for use with vehicle bodies which include the usual roof panel and a generally box-like roof rail structure. This embodiment differs from the first embodiment described above primarily in the manner of engagement of the lever member with the roof structure and allows for economies in the fabrication of the lever member.

Figure 5:
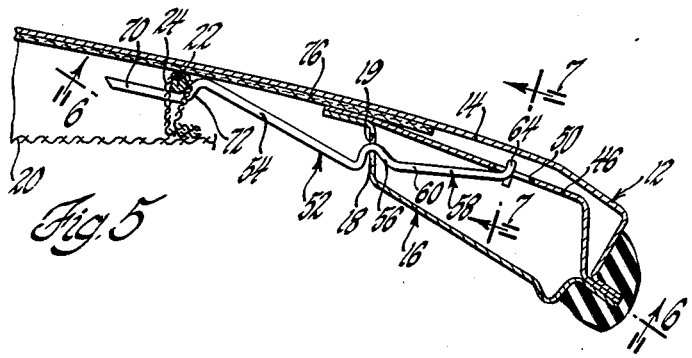
FIGURE 5 is a view similar to FIGURE 1 showing a second embodiment of the invention.
Figure 7:
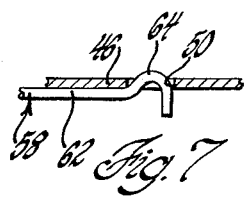
Figure 6:
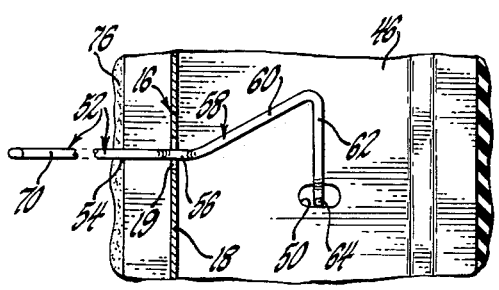
FIGURE 6 is a view taken generally along the plane indicated by 6—6 of FIGURE 5; and, FIGURE 7 is a view taken generally along the plane indicated by line 7—7 of FIGURE 5.

Referring now to FIGURE 5, wherein like numerals indicate like parts, the roof structure 12 of the body 10 includes the roof panel 14, the roof rail 16, and an additional reinforcing member or roof rail 46 having its forward flanged edge welded to the forward flanged edge of rail 16 and its rearward flanged edge welded to the rearward flanged edges of rail 16 and roof panel 14. Rails 16 and 46 thus provide a rigid box-like rail structure reinforcing body 10. A generally horizontal downwardly sloping portion of rail 46 is provided with an elongated slot 50.

The listing wire support of this embodiment of the invention generally comprises a lever like member 52 formed from a single strand of spring wire or rod which is bent intermediate its ends into an obtuse angle to provide a support portion 54, a holding and fulcrum bend 56, and a retaining head portion 58 having angularly disposed legs 60 and 62. Leg 62 is located normal to portion 54 and includes a lateral semi-circular seating bend 64 which is adapted to be received in slot 50 when member 52 is mounted on rails 16 and 46. A sharpened end portion 70 of member 52 cooperates with portion 54 in providing a listing wire seating bend 72.

Member 52 is mounted on the body by moving portion 58 through aperture 19 into engagement with the downwardly sloping portion of rail 46, and then forcing the portion 58 rearwardly along the rail 46 until bend 56 rests on the lower edge of aperture 19, whereupon bend 64 is positioned within slot 50 to secure member 52 against lateral movement. Portions 54 and 58 are normally located at a predetermined angle of approximately 150 degrees and this angular relationship is increased when member 52 is mounted on the body as portion 54 resiliently engages a deadener panel 76 secured to the roof panel 14. The sharpened end portion 74 pierces loop 24 immediately under listing wire 22 to seat the listing wire in bend 72 and resiliently support the listing wire and headlining 20.

Certain modifications may be made to this embodiment of the invention, such as dispensing with bend 64 and slot 50 and providing downwardly extending beads on the rail 46 to engage legs 60 and 62 to prevent lateral displacement of the retaining portion 58, and providing a lanced tab in rail 46 to receive either leg 60 or leg 62 to prevent vertical displacement of portion 58.

Thus this invention provides an improved listing wire support for vehicle bodies.

I claim:

1. In a vehicle body including a roof structure and a listing wire, listing wire support means comprising, an elongated lever member fulcrumed intermediate its ends on said body, one end portion of said member supporting said listing wire, the other end portion of said member bearing against said roof structure to prevent downward displacement of said one end of said member.

2. In a vehicle body including a roof structure, a headlining, and a listing wire, a listing wire support comprising, an elongated lever-like spring member fulcrumed intermediate its ends on said body, one end portion of said member engaging said listing wire, the other end portion of said member being located in biased engagement with said roof structure and acting about said fulcrum to resist downward displacement of said one end portion of said member.

3. In a vehicle body having a roof structure and a listing wire, means for supporting said listing wire against displacement relative to said roof structure comprising, a body member having an aperture therein, an elongated lever-like spring member extending through said aperture and fulcrumed intermediate its ends on an edge portion thereof, said spring member including two angularly related portions, one of said portion supporting adjacent its free end said listing wire, the other of said portions being displaed downwardly about said fulcrum and bearing against said roof structure, said displacement tending to increase the angular relation between said portions to urge said one portion against said listing wire.

4. In a vehicle body having a roof structure, and a headlining listing wire, a listing wire support means comprising, a body member provided with an aperture therein, and an elongated lever member including two angularly related portions, one portion being generally V shaped and the other portion being generally U shaped, said lever member extending through said aperture and being fulcrumed on an edge portion thereof at the intersection of said portions, said V shaped portion supporting said listing wire, said U shaped portion being displaced about said fulcrum and bearing against said roof structure, said displacement tending to increase the angular relation between said portions to urge said V shaped portion against said listing wire.

5. In a vehicle body having a roof structure, and a headlining listing wire, listing wire support means comprising, a roof member having a generally vertically disposed portion with an aperture therein, and an elongated lever member having two legs and a base, said legs bent intermediate their ends to form two obtusely intersecting portions, one portion being generally V shaped and including a seating bend adjacent the vertex thereof, the other of said portions being generally U shaped, said lever member extending horizontally through said aperture of said vertical portion and fulcrumed on an edge portion thereof about the intersection of said portions, said listing wire being received in said seating bend, said U shaped portion being downwardly displaced about said fulcrum and bearing against said roof structure, said displacement tending to increase the obtuse relation between said portions to urge said V shaped portion upward against said listing wire.

6. In a vehicle body having a roof structure and a headlining listing wire, a listing wire support means comprising, a first roof member provided with an aperture therein, a second roof member spaced from said first member and having an elongated slot formed therein, an elongated lever-like spring member bent intermediate its ends to form a main rod portion intersecting angularly with a retaining head portion, said lever member extending through said aperture and fulcrumed on an edge thereof at said intersection of said portions, said rod portion supporting said listing wire, said retaining head portion being downwardly displaced about said fulcrum and bearing against said second roof member, and means positively locating said retaining head portion on said second roof member, said displacement tending to increase the angular relation between said portions to urge said rod portion about said fulcrum against said listing wire.

7. In a vehicle body having a roof structure, and a headlining listing wire, a listing wire support means comprising; a first roof member having a generally vertically disposed portion with an aperture therein, a second roof member spaced from and overlying said first member and having an elongated slot formed therein, and an elongated lever-like spring member bent intermediate its ends to form a main rod portion intersecting obtusely at one end thereof with a retaining head portion having a pair of diverging legs, a locating bend formed in one of said legs, said rod portion having a seating bend formed therein adjacent its other end, said lever member extending horizontally through said aperture of said vertical portion and fulcrumed on an edge thereof about said intersection of said portions, said listing wire received in said seating bend of said rod portion, said retaining head portion being downwardly displaced about said fulcrum and having said one leg thereof bearing against said second roof member, said locating bend being inserted in said elongated slot to positively locate said retaining head portion, said displacement tending to increase the obtuse angle between said arm portions to urge said rod portion upward about said fulcrum against said listing wire.

References Cited by the Examiner

UNITED STATES PATENTS

| 437,056 | 9/90 | Stangl | 24—255 |
| 2,143,943 | 1/39 | Haberstrump | 296—137 |

A. HARRY LEVY, *Primary Examiner.*

PHILIP ARNOLD, *Examiner.*